Jan. 12, 1960          W. D. DRUKKER          2,920,661
              DEVICE FOR STRAIGHTENING ARTICLES
                     Filed Dec. 29, 1955
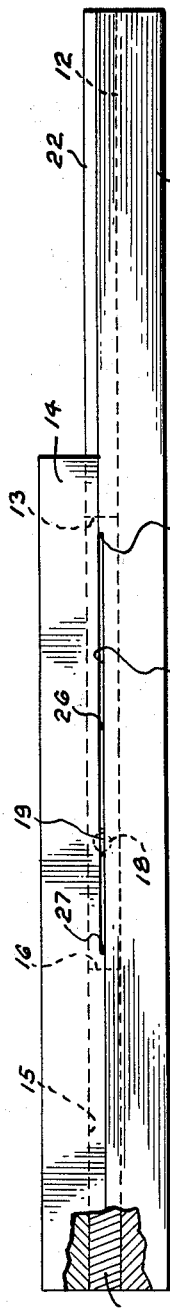
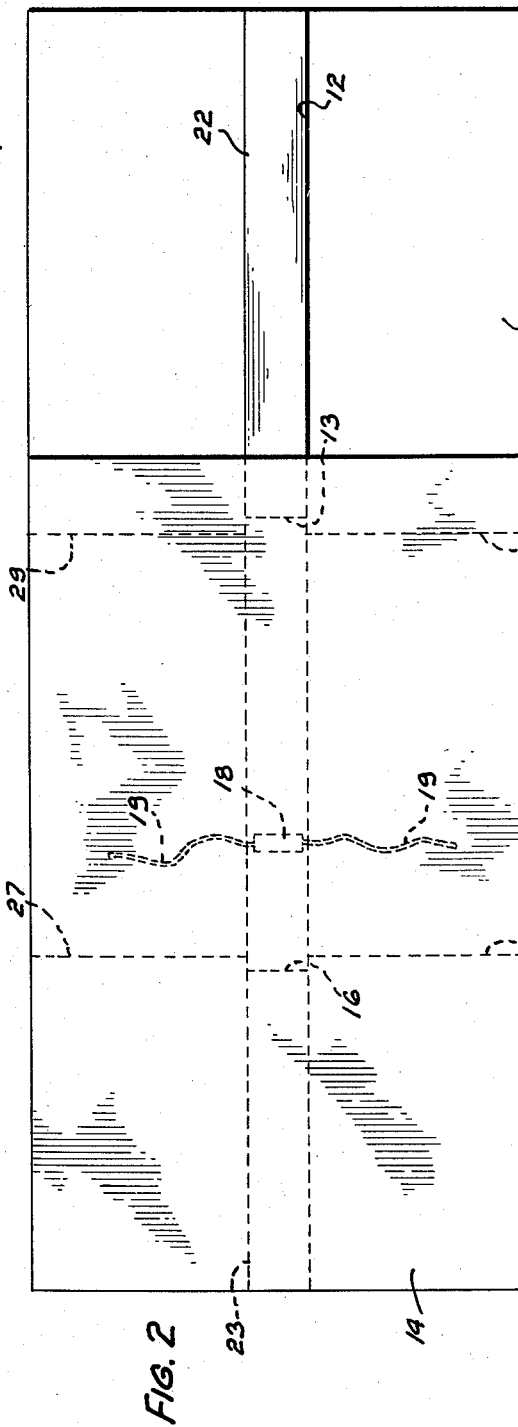
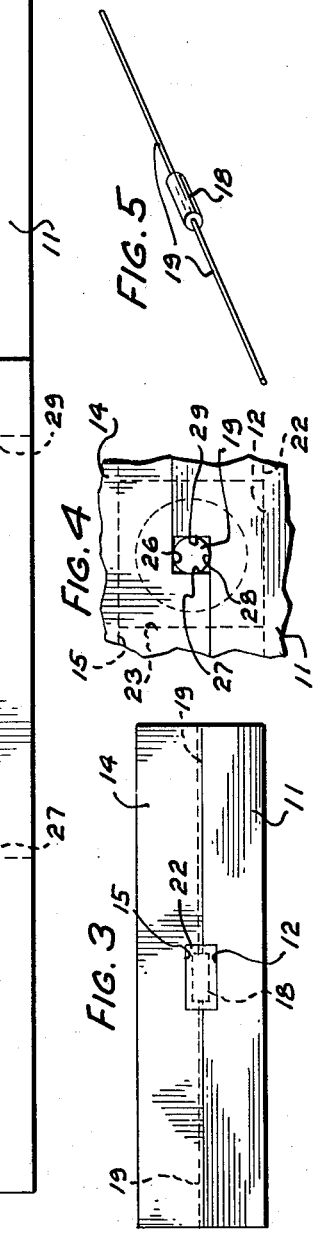
INVENTOR
W. D. DRUKKER
BY C. B. Hamilton
ATTORNEY United States Patent Office 2,920,661
Patented Jan. 12, 1960

2,920,661

DEVICE FOR STRAIGHTENING ARTICLES

Willard D. Drukker, Downers Grove, Ill., assignor to Western Electric Company, Incorporated, New York, N.Y., a corporation of New York Application December 29, 1955, Serial No. 556,133

1 Claim. (Cl. 140—147)

This invention relates to devices for straightening articles and more particularly to devices for straightening lead wires of electrical components.

An object of this invention is to provide a new and novel device for straightening bent lead wires of electrical components.

In a device illustrating features of the invention an electrical component having lead wires to be straightened is placed between a pair of plates having corresponding grooves for receiving the component and also having cooperating parallel plane surfaces for engaging the lead wires of the component, whereupon one of the plates is moved relative to the other to roll the lead wires therebetween to straighten them. The plates are also provided with cooperating surfaces which are perpendicular to the plane surfaces and between which the lead wires are bumped to further straighten them and set up stresses therein to cause them to remain straight after the rolling operation.

A complete understanding of the invention may be obtained from the following detailed description of a device forming a specific embodiment thereof, when read in conjunction with the appended drawing, in which Fig. 1 is a front view of the device with portions of the plates cut away to show the keys for retaining the plates in sliding relationship;

Fig. 2 is a plan view of the device showing positioned between the plates an electrical component having lead wires to be straightened;

Fig. 3 is an end view of the disclosure of Fig. 2 showing the electrical component positioned in the slots in the plates;

Fig. 4 is an enlarged fragmentary elevational view of the device showing the relative positions of the plates and the electrical component at the end of the straightening operation where the leads are bumped; and Fig. 5 is a perspective view of an electrical component, the lead wires of which have been straightened by the above device embodying the present invention.

Referring now in detail to the drawing, a lower plate 11 having a longitudinal slot 12 is shown slidably supporting an upper plate 14 having a longitudinal slot 15 corresponding to the slot 12 in the lower plate 11, these slots 12 and 15 being of a size to receive an electrical component 18 having lead wires 19 to be straightened. Rectangular guide keys 22 and 23 positioned in the slots 12 and 15 extending from the ends of the plates and terminating at 13 and 16, respectively, as illustrated in the drawing are provided for maintaining the plates 11 and 14 in alignment during sliding.

The guide key 22 is secured in the slot 12 in the lower plate 11 and the guide key 23 is secured in the slot 15 in the upper plate 14.

The right hand portion of the lower side of the upper plate 14 is relieved (Fig. 1) to provide a horizontal upper plane surface 26 and a depending stop surface 27, the stop surface 27 being perpendicular to the upper plane surface 26 and equal in height to the thickness of a lead wire 19 of the electrical component 18. The left hand portion of the upper side of the lower plate 11 is relieved (Fig. 1) to provide a horizontal lower plane surface 28 for cooperating with the upper plane surface 26 on the upper plate 14 to roll the lead wires 19 therebetween to straighten them, the electrical component 18 being positioned in the cooperating slots 12 and 15 in the plates 11 and 14 with its lead wires 19 extending outward between the cooperating surfaces 26 and 28. An upstanding stop surface 29 equal in height to the thickness of one of the lead wires 19 and perpendicular to the lower plane surface 28 is provided on the lower plate 11 for cooperating with the depending stop surface 27 to strike or bump the lead wires 19 therebetween to set up stresses in the lead wires to cause them to remain straight. If the lead wires 19 are bent to such a degree that they do not roll but merely slide between the surfaces 26 and 28 and are thus not straightened by rolling, they will be straightened by the striking or bumping between the stop surfaces. The inner ends of the keying members 22 and 23 are spaced from the stop surfaces 29 and 27, respectively, whereby space is provided between the keying members for the component 18 when the lead wires 19 are bumped as shown in Fig. 4.

In operation, the upper plate 14 is raised from its position on the lower plate 11 and an electrical component 18 is positioned on the lower plate 11 as illustrated in Fig. 2, the component 18 being in the slot 12 with its lead wires 19 extending over the lower plane surface 28. The upper plate 14 is then positioned on the lower plate 11 as shown in Figs. 1 and 2 with the guide keys 22 and 23 interlocking the plates. An operator then manually moves the upper plate 14 to the right (Figs. 1 and 2), whereupon the lead wires 19 are rolled between the plane surfaces 26 and 28, this rolling action straightening the lead wires.

As the upper plate 14 moves to the right the depending stop surface 27 approaches the upstanding stop surface 29 until the lead wires 19 are struck between the stop surfaces 27 and 29 as illustrated in Fig. 4. When the upper plate 14 is suddenly stopped by engagement of the stop surfaces 27 and 29 with the lead wires 19 the sharp blow to the lead wires 19 sets up stresses therein which cause the lead wires to remain straight. This sharp blow also straightens the lead wires 19 if they were originally bent to such a degree that they did not roll but merely slid between the surfaces 26 and 28 as the upper plate 14 was moved to the right.

The upper plate 14 is now raised and the electrical component 18 having straightened the wires 19 (Fig. 5) is removed, whereupon another component 18 having lead wires 19 to be straightened is manually positioned on the lower plate 11 and the above procedure is repeated.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

A device for straightening wires, comprising an elongated lower plate having a first plane surface for supporting a wire to be straightened and a raised portion at one end thereof and also having a first slot extending from end to end of said plate through the first plane surface and the raised portion, said raised portion having a stop surface intersecting said first plane surface at right angles, an elongated upper plate having a second plane surface slidably positioned on the raised portion of the lower plate and a depending portion slidably engaging the first plane surface of the lower plate to hold said plane surfaces in spaced relationship and also having a second slot extending from end to end of said plate through the second plane surface and the depending portion, said slots cooperating to receive an electrical component having lead wires extending between the plane surfaces, said depending portion having a stop surface facing the stop surface on the lower plate and intersecting said second plane surface at right angles for cooperating with said stop surface on the lower plate to strike the wire therebetween after it is straightened, a first guide key slidably positioned in the second slot in the upper plate and secured in that portion of the first slot extending through the raised portion of the lower plate, and a second guide key slidably positioned in the first slot in the lower plate and secured in that portion of the second slot extending through the depending portion of the upper plate, said guide keys maintaining the plates in alignment.

References Cited in the file of this patent
UNITED STATES PATENTS

| | | |
|---|---|---|
| 93,256 | Warr | Aug. 3, 1869 |
| 290,231 | Hill | Dec. 18, 1883 |
| 503,393 | Vollmer | Aug. 15, 1893 |
| 994,941 | Lewis | June 13, 1911 |
| 2,771,206 | Daniels et al. | Nov. 20, 1956 |